(12) United States Patent
Hisanaga et al.

(10) Patent No.: US 11,703,018 B1
(45) Date of Patent: Jul. 18, 2023

(54) EXHAUST HEAT RECOVERY DEVICE

(71) Applicant: Marelli Corporation, Saitama (JP)

(72) Inventors: Tooru Hisanaga, Saitama (JP); Naoharu Chiba, Saitama (JP); Shirou Nakajima, Saitama (JP)

(73) Assignee: Marelli Corporation, Saitama (JP)

( * ) Notice: Subject to any disclaimer, the term of this patent is extended or adjusted under 35 U.S.C. 154(b) by 0 days.

(21) Appl. No.: 17/928,147

(22) PCT Filed: May 26, 2021

(86) PCT No.: PCT/JP2021/020078
§ 371 (c)(1),
(2) Date: Nov. 28, 2022

(87) PCT Pub. No.: WO2021/241655
PCT Pub. Date: Dec. 2, 2021

(30) Foreign Application Priority Data

May 29, 2020 (JP) .................. 2020-094806

(51) Int. Cl.
*F02M 26/30* (2016.01)
*F01N 5/02* (2006.01)
*F01N 13/08* (2010.01)
*F02M 26/28* (2016.01)
*F02M 26/26* (2016.01)

(52) U.S. Cl.
CPC ............... *F02M 26/30* (2016.02); *F01N 5/02* (2013.01); *F01N 13/08* (2013.01); *F02M 26/26* (2016.02); *F02M 26/28* (2016.02)

(58) Field of Classification Search
CPC ........ F02M 26/30; F02M 26/26; F02M 26/28; F02M 26/32; F01N 5/02; F01N 13/08
See application file for complete search history.

(56) References Cited

U.S. PATENT DOCUMENTS

2018/0171940 A1* 6/2018 González ............... F02M 26/26

FOREIGN PATENT DOCUMENTS

| JP | 2014-530985 A | 11/2014 |
| JP | 6170842 B2 | 7/2017 |
| JP | 2018-071414 A | 5/2018 |

* cited by examiner

*Primary Examiner* — Jacob M Amick
(74) *Attorney, Agent, or Firm* — Young Basile Hanlon & MacFarlane, P.C.

(57) ABSTRACT

An exhaust heat recovery device includes: a first flow path member; a second flow path member adjacent to the first flow path member, and which includes a heat exchange unit configured to perform heat exchange between exhaust gas flowing in the second flow path and a refrigerant; a valve mechanism configured to switch between opening and closing of the first flow path and the second flow path; and a drive unit which includes a drive shaft configured to rotate the rotation shaft portion. The second flow path member is inclined with respect to a flow direction of the exhaust gas in the first flow path, and the drive shaft extends toward the first flow path member and is connected to the rotation shaft portion in a region formed on a lateral side of the second flow path member when viewed in an axial direction of the drive shaft.

12 Claims, 12 Drawing Sheets

EXHAUST HEAT RECOVERY DEVICE

CROSS-REFERENCE TO RELATED APPLICATION(S)

This application claims priority to and the benefit of Japanese Patent Application Serial No. 2020-094806, filed May 29, 2020, the entire disclosure of which is hereby incorporated by reference.

TECHNICAL FIELD

The present invention relates to an exhaust heat recovery device.

BACKGROUND ART

JP6170842B describes an exhaust heat recovery device that includes a first flow path through which exhaust gas passes through a heat exchanger and a second flow path through which the exhaust gas bypasses the heat exchanger, and recovers heat of the exhaust gas by heat exchange between the exhaust gas and a medium. In the exhaust heat recovery device, a first valve body blocks the second flow path by rotating a valve shaft. When the exhaust gas is introduced into the exhaust heat recovery device in this state, the exhaust gas flows toward the first flow path and heats the medium flowing in the heat exchanger.

SUMMARY OF INVENTION

However, in the exhaust heat recovery device of JP6170842B, the heat exchanger is disposed parallel to the second flow path at a position in front of the valve shaft. Therefore, it is difficult to make the exhaust heat recovery device compact in a longitudinal direction (flow direction of the exhaust gas).

An object of the present invention is to provide a compact exhaust heat recovery device.

According to an aspect of the present invention, an exhaust heat recovery device configured to recover heat of exhaust gas discharged from an engine by heat exchange with a refrigerant, the exhaust heat recovery device including: a first flow path member in which a first flow path through which the exhaust gas flows is formed; a second flow path member which is provided adjacent to the first flow path member, in which a second flow path that bypasses a part of the first flow path is formed, and which includes a heat exchange unit configured to perform heat exchange between the exhaust gas flowing in the second flow path and the refrigerant; a valve mechanism configured to switch between opening and closing of the first flow path and the second flow path by rotation of a rotation shaft portion disposed in the first flow path member; and a drive unit which includes a drive shaft configured to rotate the rotation shaft portion, wherein the second flow path member is disposed so as to be inclined with respect to a flow direction of the exhaust gas in the first flow path, and the drive shaft extends toward the first flow path member and is connected to the rotation shaft portion in a region formed on a lateral side of the second flow path member when viewed in an axial direction of the drive shaft of the drive unit by disposing the second flow path member so as to be inclined with respect to the first flow path member.

In this aspect, a second flow path member is disposed so as to be inclined with respect to a flow direction of exhaust gas in a first flow path. In addition, a drive shaft extends toward a first flow path member and is connected to a rotation shaft portion in a region formed on a side of the second flow path member when viewed in an axial direction of the drive shaft of a drive unit by disposing the second flow path member so as to be inclined with respect to the first flow path member. Accordingly, the rotation shaft portion and the drive shaft can be disposed on an upstream side in the flow direction of the exhaust gas in the first flow path. Therefore, the entire exhaust heat recovery device can be made compact in the flow direction of the exhaust gas in the first flow path.

DESCRIPTION OF EMBODIMENTS

Hereinafter, an exhaust heat recovery device 100 according to an embodiment of the present invention will be described with reference to the drawings.

First, an overall configuration of the exhaust heat recovery device 100 will be described with reference to FIGS. 1 to 4.

Figure 1:
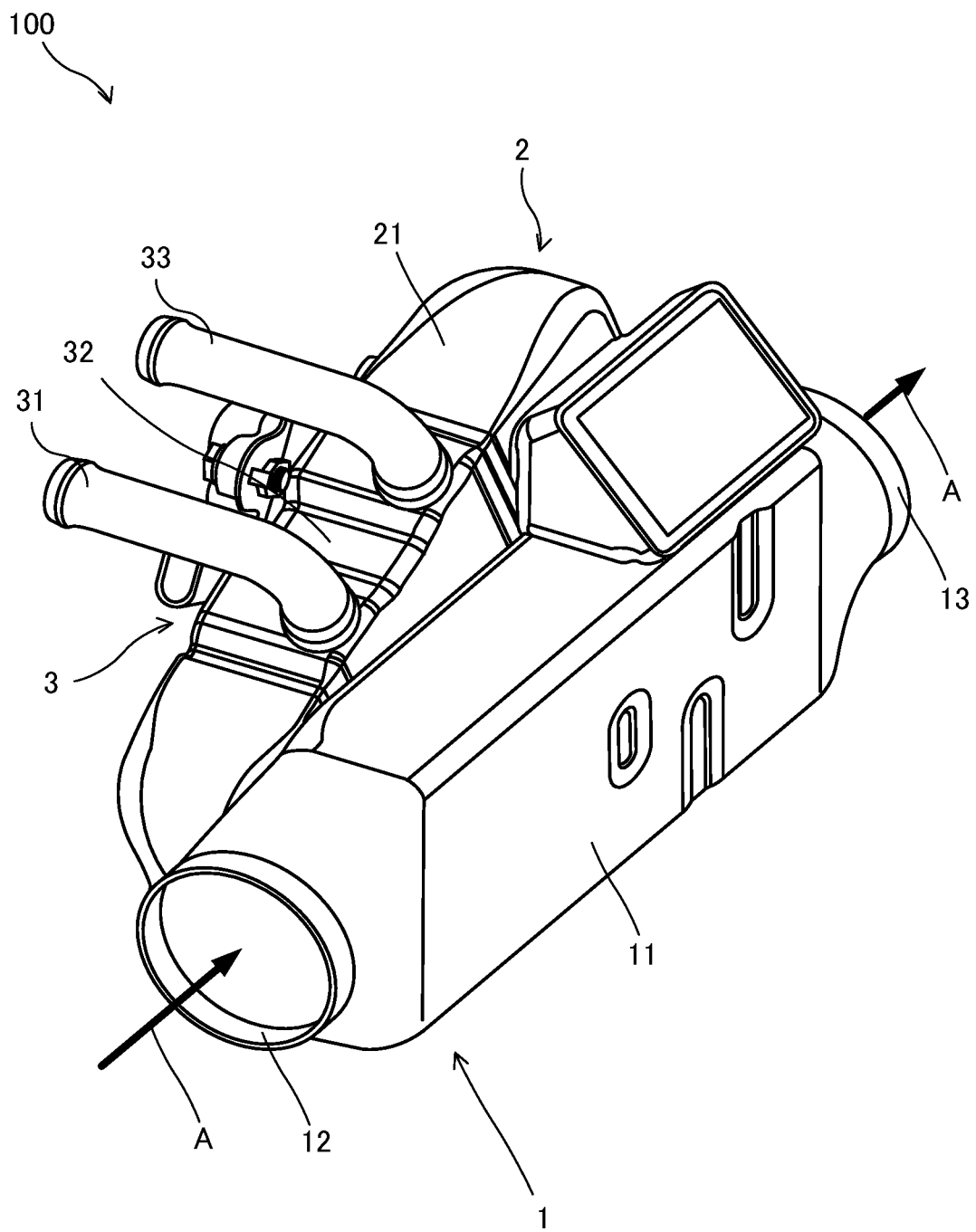
FIG. 1 is a perspective view of an exhaust heat recovery device according to an embodiment of the present invention as viewed from a front side thereof.
Figure 2:
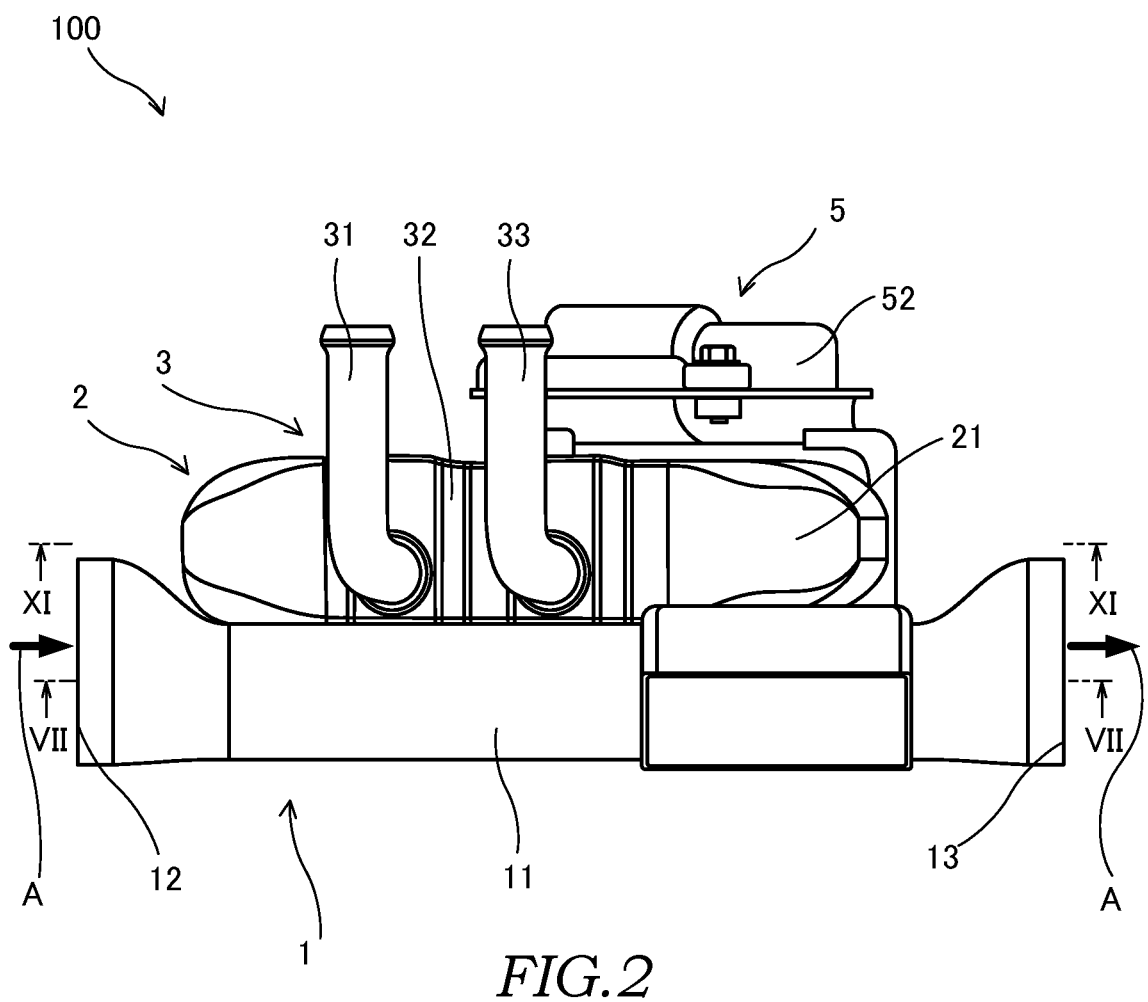
FIG. 2 is a top view of the exhaust heat recovery device shown in FIG. 1.
Figure 3:
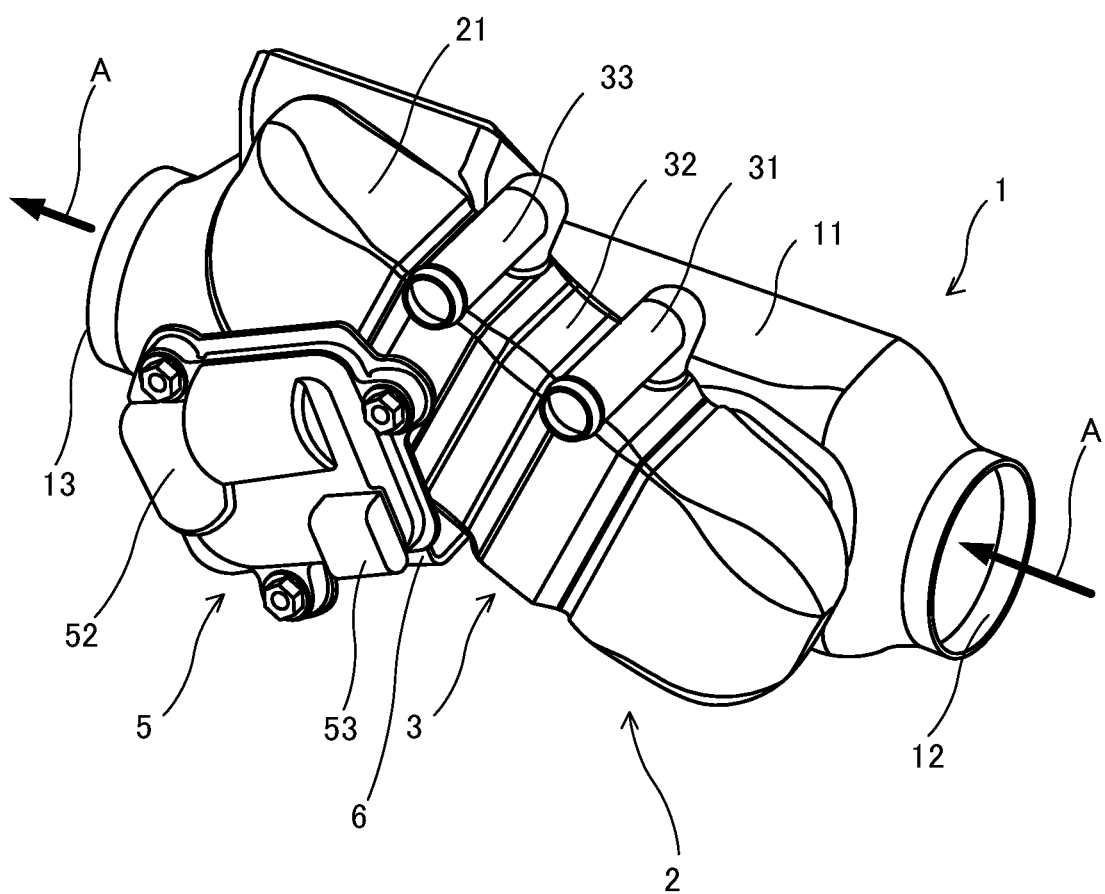
FIG. 3 is a perspective view of the exhaust heat recovery device shown in FIG. 1 as viewed from a rear side thereof.
Figure 4:
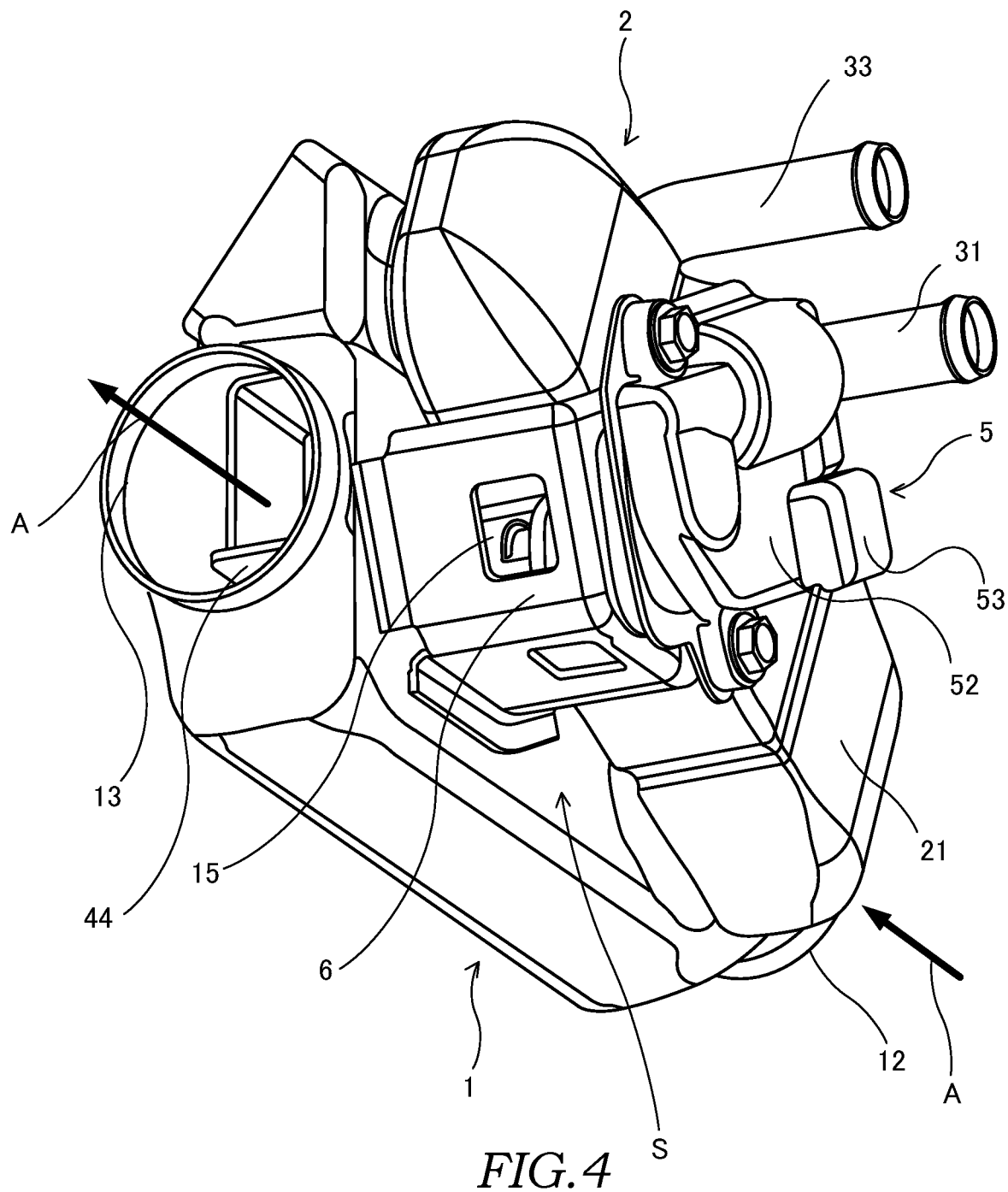
FIG. 4 is a perspective view of the exhaust heat recovery device shown in FIG. 1 as viewed from a bottom side thereof.

FIG. 1 is a perspective view of the exhaust heat recovery device 100 as viewed from a front side thereof. FIG. 2 is a top view of the exhaust heat recovery device 100 shown in FIG. 1. FIG. 3 is a perspective view of the exhaust heat recovery device 100 shown in FIG. 1 as viewed from a rear side thereof. FIG. 4 is a perspective view of the exhaust heat recovery device 100 shown in FIG. 1 as viewed from a bottom side thereof. In FIGS. 1 to 4, a flow of exhaust gas in a first flow path member 1 is indicated by an arrow A.

As shown in FIGS. 1 to 4, the exhaust heat recovery device 100 includes the first flow path member 1, a second flow path member 2, a heat exchange unit 3, an actuator 5 as a drive unit, and a bracket 6. Although details will be described later, the exhaust heat recovery device 100 also includes a valve mechanism 4.

As shown in FIGS. 1 to 4, the first flow path member 1 includes a main body 11, a first inflow port 12, and a first outflow port 13.

As shown in FIG. 1, the main body 11 is formed in a substantially rectangular parallelepiped shape. In the main body 11, the first inflow port 12 is opened at one end, and the first outflow port 13 is opened at the other end.

The first inflow port 12 is connected to an upstream side of an exhaust flow path of an engine (not shown). The first outflow port 13 is connected to a downstream side of the exhaust flow path of the engine (not shown). Although details will be described later, the main body 11 has a hollow structure through which the exhaust gas can pass. Accordingly, as indicated by the arrow A in FIGS. 1 to 4, exhaust gas flowing from the exhaust flow path of the engine can flow into the main body 11 from the first inflow port 12, and can flow out from the first outflow port 13 to the downstream side of the exhaust flow path (outside of the main body 11).

As shown in FIGS. 1 to 4, the second flow path member 2 is formed in a structure connected to the first flow path member 1. The second flow path member 2 is provided adjacent to the first flow path member 1. The second flow path member 2 includes the heat exchange unit 3. Although details will be described later, the second flow path member 2 has a hollow structure through which the exhaust gas can pass. In addition, the hollow structure of the second flow path member 2 is coupled to the hollow structure of the first flow path member 1, and the exhaust gas flowing into the first flow path member 1 can flow into the second flow path member 2.

As shown in FIGS. 1 and 3, the heat exchange unit 3 constitutes a part of an outer circumference of a main body 21. Cooling water as a refrigerant flows inside the heat exchange unit 3, and the refrigerant may be a medium such as a liquid or a gas suitable for heat exchange other than the cooling water. When the exhaust gas passes through the second flow path member 2, heat exchange between the exhaust gas and the cooling water in the heat exchange unit 3 is performed in the heat exchange unit 3. A configuration of the heat exchange unit 3 will be described later in detail.

As shown in FIG. 3, in the actuator 5, a main body 52 is inclined and provided at a position of being partially overlapped with the second flow path member 2 and the heat exchange unit 3 on an outer circumferential side thereof. In addition, the actuator 5 includes a drive shaft 51 extending toward the first flow path member 1 (see FIG. 8).

As shown in FIG. 4, the bracket 6 is provided at a position on a bottom side of the second flow path member 2 and the heat exchange unit 3.

Next, details of the configuration of the exhaust heat recovery device 100 described above and the valve mechanism 4 provided in the exhaust heat recovery device 100 will be described with reference to FIGS. 1 to 4 and FIGS. 5 to 8.

Figure 5:
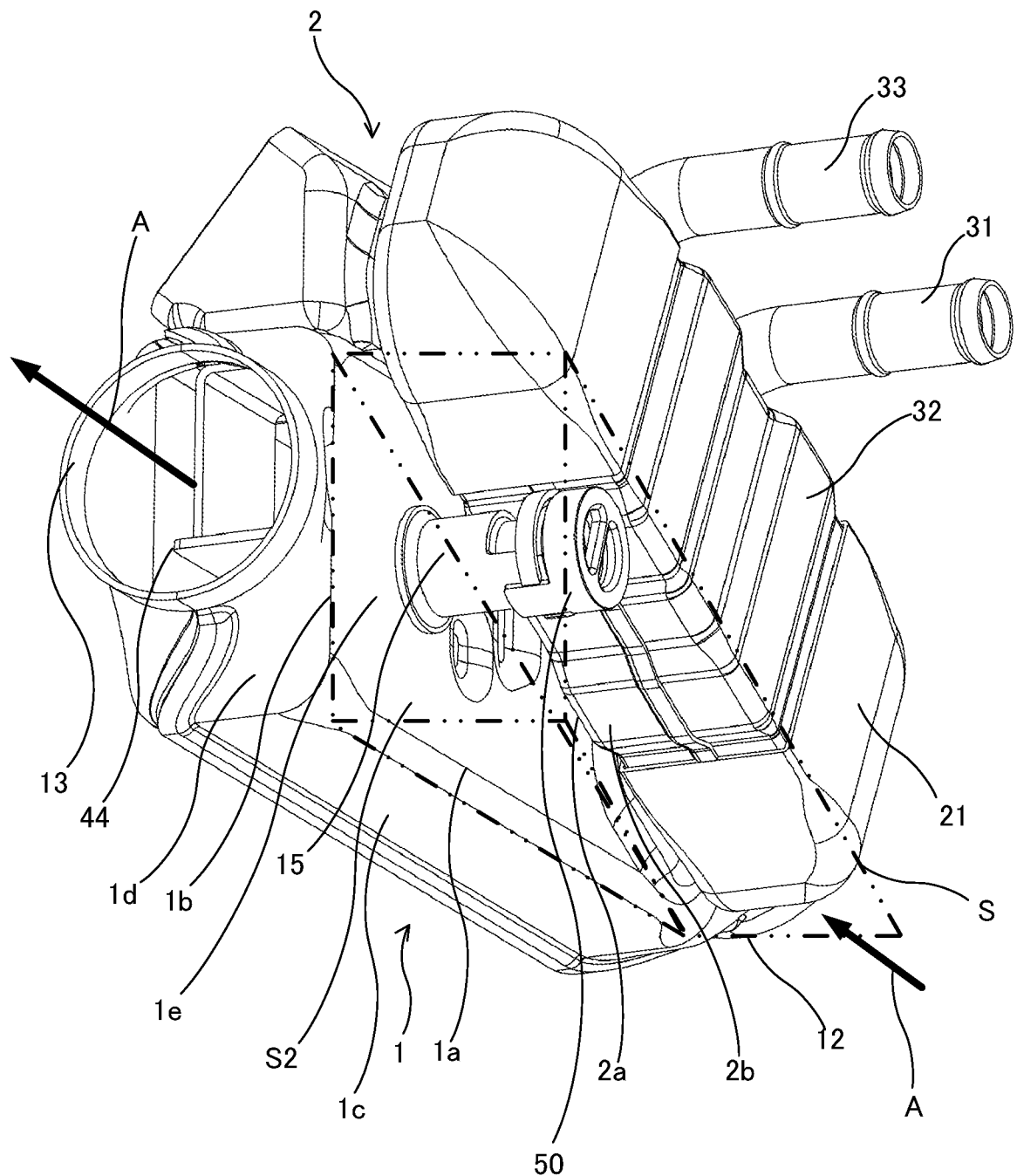
FIG. 5 is a view illustrating a shaft portion provided in a first flow path member in FIG. 4.
Figure 6:
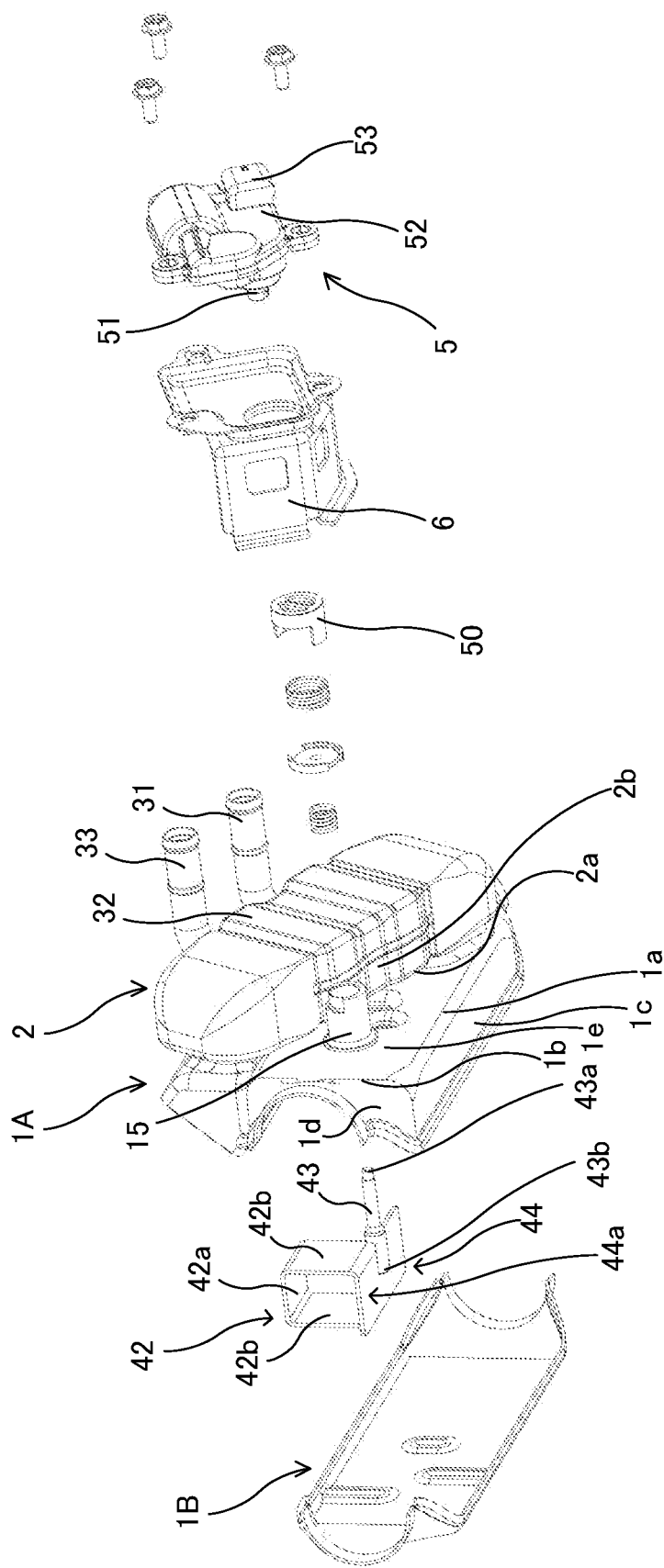
FIG. 6 is an exploded perspective view of the exhaust heat recovery device shown in FIG. 1.
Figure 7:
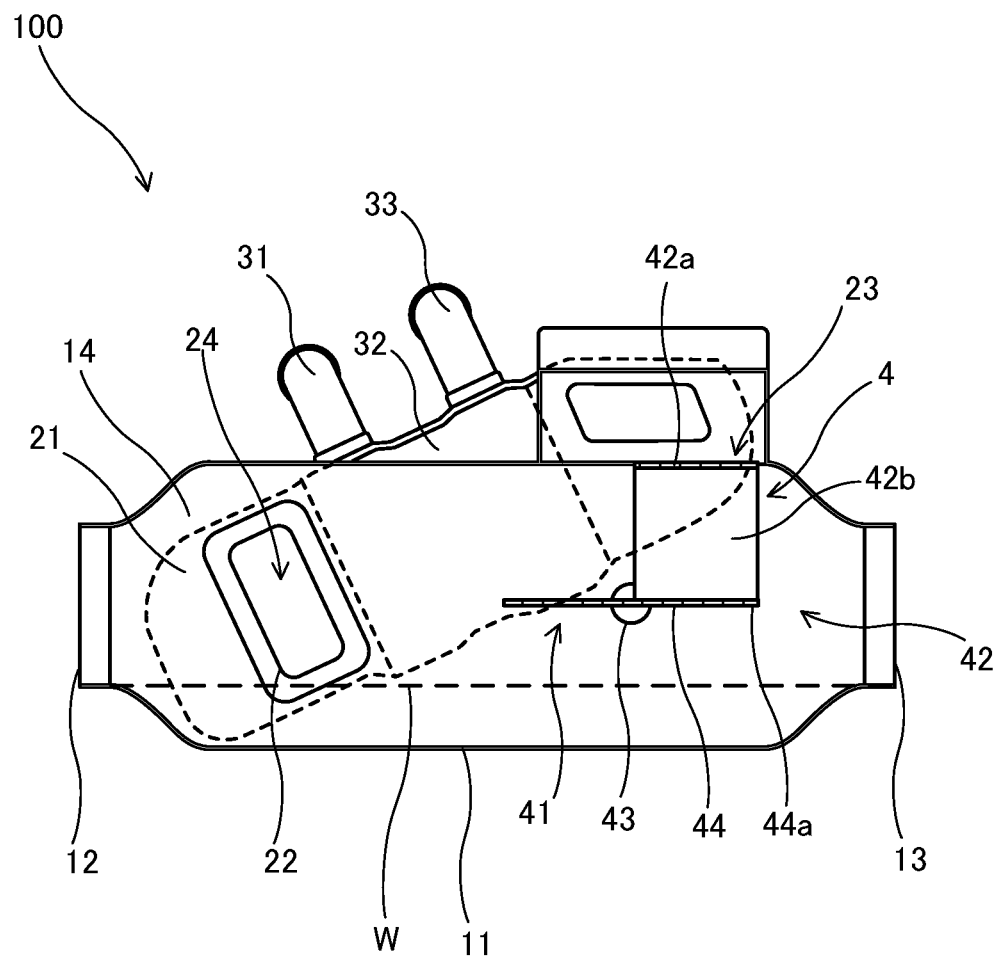
FIG. 7 is a schematic view of a VII-VII cross section in FIG. 2.
Figure 8:
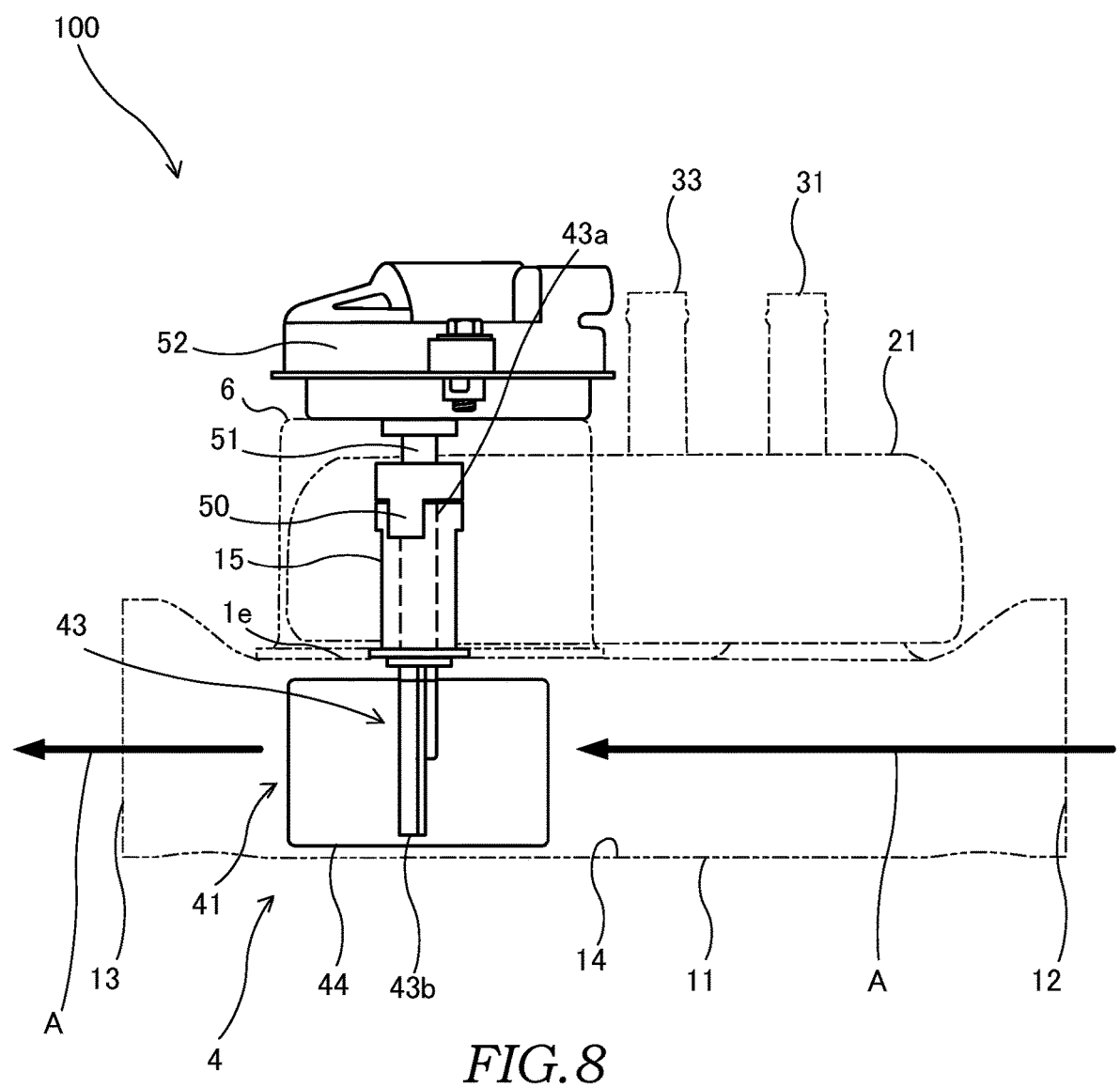
FIG. 8 is a view of the exhaust heat recovery device shown in FIG. 1 as viewed from the bottom side, and is a view illustrating a valve mechanism and a drive unit.

FIG. 5 is a view illustrating a bearing 15 provided in the first flow path member 1 in FIG. 4. In FIG. 5, the flow of the exhaust gas in the first flow path member 1 is indicated by an arrow A. FIG. 6 is an exploded perspective view of the exhaust heat recovery device 100 shown in FIG. 1. FIG. 7 is a schematic view of a VII-VII cross section in FIG. 2. FIG. 8 is a view of the exhaust heat recovery device 100 shown in FIG. 1 as viewed from the bottom side, and is a view illustrating the valve mechanism 4 and the actuator 5. In FIG. 8, the flow of the exhaust gas in the first flow path member 1 is indicated by an arrow A.

First, configurations of the first flow path member 1 and the second flow path member 2 will be described in detail.

As shown in FIG. 7, the first flow path member 1 has a hollow structure, and a first flow path 14 is formed inside the first flow path member 1.

As shown in FIG. 7, the second flow path member 2 includes the main body 21, a second inflow port 22, and a second outflow port 23. The main body 21 has a hollow structure, and a second flow path 24 is formed inside the main body 21. In the main body 21, the second inflow port 22 is opened at one end side, and the second outflow port 23 is opened at the other end side. Opening positions of the second inflow port 22 and the second outflow port 23 are appropriately changed according to a design of the exhaust heat recovery device 100, and are not limited to positions shown in FIG. 7.

As shown in FIG. 7, the second inflow port 22 is connected to the first flow path member 1 on the first inflow port 12 side. The second outflow port 23 is connected to the first flow path member 1 on a first outflow port 13 side. Accordingly, the first flow path 14 and the second flow path 24 communicate with each other. That is, the exhaust gas flowing into the main body 11 from the first inflow port 12 can flow into the main body 21 from the second inflow port 22. Further, the exhaust gas flowing into the main body 21 from the second inflow port 22 can flow out from the second outflow port 23 to the main body 11.

In other words, the above configuration is a configuration in which the second flow path 24 bypasses a part of the first flow path 14 (section between the second inflow port 22 and the second outflow port 23).

As shown in FIG. 7, the second inflow port 22 and the second outflow port 23 are connected to the first flow path member 1 at a position higher than a water immersion line W. Here, the water immersion line W is a line indicating an upper limit of height of a water level at which water does not flow into an inside of the exhaust heat recovery device 100 (inside of the first flow path 14) when the exhaust heat recovery device 100 is immersed in the water. Here, since the first inflow port 12 and the first outflow port 13 have the same height, the water immersion line W is positioned at lower ends of the first inflow port 12 and the first outflow port 13. This is because when the height of the water level exceeds the lower ends of the first inflow port 12 and the first outflow port 13, the water flows into the first flow path 14 inside the exhaust heat recovery device 100 from the first inflow port 12 and the first outflow port 13.

By setting the second inflow port 22 and the second outflow port 23 at a position higher than the water immersion line W, even if the inside of the first flow path member 1 (inside of the first flow path 14) is immersed, it is possible to prevent the water from entering the second flow path 24. That is, a decrease in heat recovery efficiency between the exhaust gas in the second flow path 24 and cooling water in the heat exchange unit 3 due to water entering the second flow path 24 can be prevented.

As shown in FIG. 7, the second flow path member 2 is disposed so as to be inclined with respect to the first flow path member 1. Specifically, the second flow path member 2 is disposed so as to be inclined with respect to a flow direction of the exhaust gas in the first flow path 14 that flows from the first inflow port 12 toward the first outflow port 13. More specifically, the second flow path member 2 is disposed so as to be inclined upward away from the first flow path 14 from an upstream side (first inflow port 12 side) toward a downstream side (first outflow port 13 side) in the flow direction of the exhaust gas in the first flow path 14.

As shown in FIG. 5, since the second flow path member 2 is integrally joined to the first flow path member 1 along the first flow path member 1 without a gap therebetween and is disposed so as to be inclined with respect to the flow direction of the exhaust gas in the first flow path 14, a region S (region indicated by a two-dot chain line in FIG. 5) is formed in a region on a lateral side of the second flow path member 2 when viewed in a direction of the drive shaft 51 of the actuator 5 (when viewed in an axial direction of the drive shaft 51 of the actuator 5). The bearing 15 for supporting a rotation shaft portion 43 of the valve mechanism 4, which will be described later, is provided in the region S.

The region S can be said to be a region surrounded by a lower edge portion 2a of the second flow path member 2, a lower edge portion 1a of the first flow path member 1, and a downstream side end portion 1b in the flow direction of the exhaust gas in the first flow path member 1 when the exhaust heat recovery device 100 is viewed in an extending direction of the drive shaft 51 of the actuator 5 (see FIG. 5).

The lower edge portion 2a is a portion including an edge of a bottom surface 2b of the second flow path member 2. That is, the lower edge portion 2a can be said to be the bottom surface 2b of the second flow path member 2 (see FIG. 5).

The lower edge portion 1a is a portion including an edge of a bottom surface 1c of the first flow path member 1. That is, the lower edge portion 1a can be said to be the bottom surface 1c of the first flow path member 1 (see FIG. 5).

The downstream side end portion 1b is a portion including an edge of a side surface 1d on the downstream side in the flow direction of the exhaust gas in the first flow path member 1. That is, the downstream side end portion 1b can be said to be the side surface 1d on the downstream side in the flow direction of the exhaust gas in the first flow path member 1 (see FIG. 5).

That is, a region surrounded by the three surfaces including the respective surfaces (bottom surface 2b of the second flow path member 2, the bottom surface 1c of the first flow path member 1, and the side surface 1d on the downstream side in the flow direction of the exhaust gas in the first flow path member 1) is the region S. In addition, the region S can also be said to be a region surrounded by the bottom surface 2b of the second flow path member 2 and a side surface 1e of the first flow path member 1 (see FIG. 5).

In other words, the region S can be said to be a region of an outer circumference of the first flow path member 1 on a second flow path member 2 side, which is not adjacent to the second flow path member 2. In addition, it can be said that the bearing 15 disposed in the region S is disposed side by side with the second flow path member 2 in a vertical direction on the drawing (see FIG. 5) when viewed in a direction of FIG. 5. A position of the bearing 15 can be appropriately changed in the region S according to a size of the exhaust heat recovery device 100.

Next, the configuration of the heat exchange unit 3 incorporated in the second flow path member 2 will be described in detail.

As shown in FIGS. 1 to 3, 5, and 7, the heat exchange unit 3 includes a refrigerant inflow portion 31, a heat exchanger main body 32, and a refrigerant outflow portion 33. As shown in FIG. 7, the heat exchange unit 3 is provided at a position higher than the water immersion line W.

That is, the heat exchange unit 3 is provided at a position where the water level does not reach even when the exhaust heat recovery device 100 is immersed and the water enters the first flow path 14. Accordingly, it is possible to prevent the heat exchange unit 3 from being immersed. Therefore, the decrease in the heat recovery efficiency between the exhaust gas in the second flow path 24 and the cooling water in the heat exchange unit 3 due to immersion of the heat exchange unit 3 can be prevented.

The refrigerant inflow portion 31 is a hollow tubular portion that connects a flow path (not shown) through which cooling water before cooling the engine flows and an inside of the heat exchanger main body 32. The refrigerant inflow portion 31 allows the cooling water serving as a refrigerant supplied from the above flow path to flow to the inside of the heat exchanger main body 32.

As shown in FIG. 3, the heat exchanger main body 32 constitutes a part of the outer circumference of the main body 21. The cooling water flowing in from the refrigerant inflow portion 31 flows to the inside of the heat exchanger main body 32.

The refrigerant outflow portion 33 is a hollow tubular portion that connects the inside of the heat exchanger main body 32 and a flow path (not shown) through which the cooling water is supplied to the engine. The refrigerant inflow portion 31 allows the cooling water flowing through the inside of the heat exchanger main body 32 to flow out to the above flow path.

When the exhaust gas flows in a portion of the main body 21 of the second flow path member 2, which is surrounded by the heat exchanger main body 32 (portion of the second flow path 24 which is surrounded by the heat exchanger main body 32), in the heat exchange unit 3 having the above configuration, heat exchange between the exhaust gas and the cooling water flowing through the inside of the heat exchanger main body 32 is performed, and heat of the exhaust gas is moved to the cooling water and recovered.

Here, the second inflow port 22 through which the exhaust gas flows into the second flow path 24 and the second outflow port 23 through which the exhaust gas flows out from the second flow path 24 are provided at positions higher than the water immersion line W (see FIG. 7). As a result, it is possible to prevent the heat exchange unit 3 from being immersed. Therefore, obstruction of the flow of the exhaust gas in the second flow path 24 due to the immersion of the heat exchange unit 3 can be prevented. Accordingly, the decrease in the heat recovery efficiency between the exhaust gas and the cooling water in the heat exchange unit 3 can be prevented.

Next, the valve mechanism 4 will be described.

As shown in FIGS. 6 to 8, the exhaust heat recovery device 100 includes the valve mechanism 4. The valve mechanism 4 includes a butterfly valve 41 and a shutter portion 42. The butterfly valve 41 includes the rotation shaft portion 43 and a valve body 44. As shown in FIG. 6, the valve mechanism 4 is incorporated in the first flow path member 1 when divided components 1A and 1B of the first flow path member are combined.

As shown in FIG. 8, in the valve mechanism 4, one end (tip end portion) 43a of the rotation shaft portion 43 is supported by the bearing 15. Accordingly, the valve mechanism 4 is rotatably supported in the first flow path 14.

As shown in FIG. 8, an one end 43a side of the rotation shaft portion 43 protrudes to an outside (corresponding to the region S in FIG. 5) of the first flow path member 1. The one end 43a of the rotation shaft portion 43 is coupled to the drive shaft 51 of the actuator 5, which will be described later, via a coupling 50. Specifically, the rotation shaft portion 43 is inserted into the bearing 15, and the one end 43a of the rotation shaft portion 43 protrudes from a tip end of the bearing 15. A spring is incorporated between the bearing 15 and the coupling 50 so as to surround the one end 43a of the rotation shaft portion 43, and the coupling 50 is pushed up by using an elastic force of the spring. Accordingly, a claw at a tip end portion of the drive shaft 51 is inserted into an insertion hole of the coupling 50, and the coupling 50 is coupled to the drive shaft 51 in a state where the coupling 50 receives a repulsive force of the spring. That is, the rotation shaft portion 43 is rotatably coupled to the drive shaft 51 through a mechanism of the coupling 50. In addition, a position where the one end 43a of the rotation shaft portion 43 and the drive shaft 51 are coupled via the coupling 50 is, for example, within the region S in the present embodiment (see FIG. 5). Further, in a base portion of the rotation shaft portion 43, a seal member for preventing leakage of gas or the like is provided on an entire circumference between the base portion and the bearing 15.

As a result, as compared with a case where the entire rotation shaft portion 43 is disposed inside the first flow path member 1, in the rotating shaft portion 43 of the present embodiment, a range affected by the heat of the exhaust gas flowing in the first flow path 14 is small due to a structure in which connection with the drive shaft 51 is performed in the region S. Accordingly, influence of the heat of the exhaust gas on the rotation shaft portion 43 (or drive shaft 51) can be reduced. Therefore, durability of the exhaust heat recovery device 100 can be improved.

As shown in FIGS. 6 and 8, the valve body 44 of the butterfly valve 41 is provided on the other end 43b side of the rotation shaft portion 43. The valve body 44 of the butterfly valve 41 is a plate-shaped portion formed to have a length and a width that are large enough to close the first flow path 14. The valve body 44 rotates together with the rotation shaft portion 43, and opens and closes the first flow path 14 according to a movement position.

As shown in FIGS. 6 and 7, the shutter portion 42 is provided on an one end 44a side of the valve body 44.

The shutter portion 42 is a portion formed in a shape capable of closing the second outflow port 23. In the present embodiment, the shutter portion 42 includes a shutter main body 42a formed to have a length and a width that are large enough to close the second outflow port 23, and coupling portions 42b that couple the shutter main body 42a and the one end 44a side of the valve body 44 to support the shutter main body 42a. As shown in FIG. 6, in the present embodiment, the shutter main body 42a is supported by two coupling portions 42b. The number of the coupling portions 42b is not limited to the number shown in FIG. 6 as long as the shutter main body 42a can be supported. For example, the number of the coupling portions 42b may be one or may be three or more.

The shutter portion 42 rotationally moves with the rotation of the valve body 44, and opens and closes the second outflow port 23 according to a movement position. That is, the valve mechanism 4 can simultaneously move the valve body 44 of the butterfly valve 41 and the shutter portion 42 to open and close the first flow path 14 and the second outflow port 23 by rotating only the rotation shaft portion 43. As a result, the number of components can be reduced as compared with a case where the butterfly valve 41 (valve body 44) and the shutter portion 42 are rotationally moved by separate mechanisms. In addition, since it is possible to prevent the exhaust gas from flowing into the second flow path 24 without opening the second flow path 24 during non-heat recovery (state where the valve mechanism 4 is in a position shown in FIG. 9. Details will be described later), it is possible to improve performance of the exhaust heat recovery device 100 during the non-heat recovery.

The bearing 15 that supports the rotation shaft portion 43 of the valve mechanism 4 is provided adjacent to the first flow path member 1 and is disposed so as to be inclined with respect to the flow direction of the exhaust gas in the first flow path 14, so that the bearing 15 is provided in the region S formed on the lateral side of the second flow path member 2 when viewed in the direction of the drive shaft 51 of the actuator 5 (see FIG. 5). That is, the rotation shaft portion 43 is also disposed at a position in the region S. The region S is formed by disposing the second flow path member 2 so as to be inclined with respect to the flow direction of the exhaust gas in the first flow path 14. That is, by disposing the rotation shaft portion 43 in the region S, the rotation shaft portion 43 (valve mechanism 4) can be disposed on the upstream side in the flow direction of the exhaust gas in the first flow path 14 as compared with a case where the second flow path member 2 is not disposed so as to be inclined. Accordingly, the entire exhaust heat recovery device 100 can be made compact in the flow direction of the exhaust gas in the first flow path 14.

As shown in FIG. 8, only the one end 43a side of the rotation shaft portion 43 is supported by the bearing 15. That is, the rotation shaft portion 43 has a cantilever structure. Here, the one end 43a side of the rotation shaft portion 43 supported by the bearing 15 is provided longer so as to be supported by a cantilever structure (see FIG. 6).

As a result, as compared with a case where the rotation shaft portion 43 is supported on the one end 43a side and a bearing structure is provided on the other end 43b side (that is, not a cantilever structure and the rotation shaft portion 43 is supported at two points), the range affected by the heat of the exhaust gas flowing in the first flow path 14 is smaller in the rotation shaft portion 43 according to the present embodiment. Accordingly, the influence of the heat of the exhaust gas on the valve mechanism 4 (rotation shaft portion 43) and the bearing 15 can be reduced. Therefore, the durability of the exhaust heat recovery device 100 can be improved.

Next, a configuration of the actuator 5 will be described in detail. As shown in FIGS. 2 to 4, 6, and 8, the actuator 5 includes the drive shaft 51, the main body 52, and a connector 53.

As shown in FIG. 8, the drive shaft 51 extends toward the side surface 1e of the first flow path member 1. The drive shaft 51 is coupled (connected) to the one end 43a of the rotation shaft portion 43 in the region S via the coupling 50 (see FIGS. 5 and 8). Specifically, the drive shaft 51 is connected to the one end 43a of the rotation shaft portion 43 protruding to the outside of the first flow path member 1 in the region S.

The main body 52 has a mechanism for rotationally driving the drive shaft 51. The connector 53 is coupled to a power supply unit (not shown) by an electric wire. The main body 52 rotationally drives the drive shaft 51 according to electric power supplied by the power supply unit through the connector 53 and control of a control unit (not shown).

When the drive shaft 51 rotates, the rotation shaft portion 43 coupled to the drive shaft 51 rotates. The butterfly valve 41 and the shutter portion 42 of the valve mechanism 4 are rotationally moved in response to the rotation of the rotation shaft portion 43.

As shown in FIG. 3, the main body 52 is disposed with the second flow path member 2 interposed between the main body 52 and the first flow path member 1. In addition, a part of the main body 52 is fixed to an exterior (housing) of the heat exchanger main body 32 incorporated in the second flow path member 2, and the other part is fixed to the bracket 6. That is, the main body 52 is disposed at least at a position away from the first flow path 14. Therefore, since the main body 52 is provided at the above position, the main body 52 is less likely to be affected by the heat of the exhaust gas flowing in the first flow path 14. Accordingly, durability of the actuator 5 can be improved. Further, in the present embodiment, by providing the actuator 5 at a position corresponding to the heat exchanger main body 32, it is possible to prevent the influence of the heat of exhaust gas flowing through the second flow path member 2. The actuator 5 may be fixed only to the heat exchanger main body 32.

When the main body 52 has a size that falls within the region S, the main body 52 may be disposed in the region S. In this case, the exhaust heat recovery device 100 can be made compact in a direction (short-length direction) orthogonal to the flow direction (longitudinal direction) of the exhaust gas in the first flow path 14. Here, when the main body 52 is disposed in the region S, it is desirable to provide a heat insulating material or a space at least between the first flow path member 1 and the main body 52. In this case, it is also desirable to fix the main body 52 to a position corresponding to the heat exchange unit 3 in the second flow path member 2. This is to prevent the main body 52 from being affected by the heat of the exhaust gas flowing in the first flow path member 1 and the second flow path member 2.

The actuator 5 (main body 52) is disposed so as to be inclined (see FIGS. 3 and 4). Specifically, the actuator 5 (main body 52) is disposed so as to be inclined with respect to the flow direction of the exhaust gas in the first flow path 14 (arrows A in FIGS. 3 and 4) along the first flow path member 1.

According to the above arrangement, a part of the main body 52 is adjacent to a second outflow port 23 side of the second flow path member 2 and an outer circumferential surface of the heat exchange unit 3 (see FIGS. 3 and 4).

Here, since the exhaust gas flowing in a portion of the second flow path member 2 on the second outflow port 23 side is already heat-recovered by the heat exchange unit 3, a temperature thereof is low. Therefore, a temperature of an outer circumferential surface of the portion of the second flow path member 2 on the second outflow port 23 side also decreases. In addition, a temperature of the outer circumferential surface of the heat exchange unit 3 also decreases by the heat recovery.

Therefore, since the main body 52 is provided at the above position, influence of the heat of the exhaust gas flowing in the second flow path 24 is suppressed. Accordingly, the durability of the actuator 5 can be improved. Therefore, the durability of the exhaust heat recovery device 100 can be improved.

As shown in FIGS. 3 and 4, the connector 53 is also inclined. Accordingly, even if the water enters the connector 53, the water can be discharged to the outside. That is, it is possible to prevent the water from accumulating in the connector 53.

The bearing 15 that supports the rotation shaft portion 43 of the valve mechanism 4 is provided adjacent to the first flow path member 1 and is disposed so as to be inclined with respect to the flow direction of the exhaust gas in the first flow path 14, so that the bearing 15 is provided in the region S formed on the lateral side of the second flow path member 2 when viewed in the direction of the drive shaft 51 of the actuator 5 (see FIG. 5). That is, the drive shaft 51 connected to the rotation shaft portion 43 is also disposed in the region S (see FIGS. 5 and 8). The region S is generated by disposing the second flow path member 2 so as to be inclined with respect to the flow direction of the exhaust gas in the first flow path 14. That is, by disposing the drive shaft 51 in the region S (connecting the drive shaft 51 to the rotation shaft portion 43 in the region S), the drive shaft 51 and the actuator 5 as a whole can be disposed on the upstream side in the flow direction of the exhaust gas in the first flow path 14 as compared with a case where the second flow path member 2 is not disposed so as to be inclined. Accordingly, the entire exhaust heat recovery device 100 can be made compact in the flow direction (longitudinal direction) of the exhaust gas in the first flow path 14.

As described above, the exhaust heat recovery device 100 has a configuration in which the drive shaft 51 extends toward the first flow path member 1 and is connected to the rotation shaft portion 43 in the region S formed by disposing the second flow path member 2 so as to be inclined with respect to the first flow path member 1, and has a configuration in which the actuator 5 is disposed with the second flow path member 2 interposed between the actuator 5 and the first flow path member 1. By adopting the above two configurations, the exhaust heat recovery device 100 can be made compact in the flow direction (longitudinal direction) of the exhaust gas in the first flow path 14, and the durability of the actuator 5 (and hence the durability of the exhaust heat recovery device 100) can be improved by suppressing the influence of the heat of the exhaust gas on the actuator 5.

Next, the bracket 6 will be described.

As shown in FIGS. 4 and 6, the exhaust heat recovery device 100 further includes the bracket 6 that surrounds outsides of the drive shaft 51, the bearing 15, and the rotation shaft portion 43. By providing the bracket 6, the drive shaft 51, the bearing 15, and the rotation shaft portion 43 can be protected from flying objects such as flying stones. In the present embodiment, the bracket 6 is provided on the first flow path member 1 (see FIGS. 4 and 6). The bracket 6 may be provided on the second flow path member 2.

Next, the heat recovery performed by the exhaust heat recovery device 100 having the above configuration will be described with reference to FIGS. 9 to 12.

Figure 9:
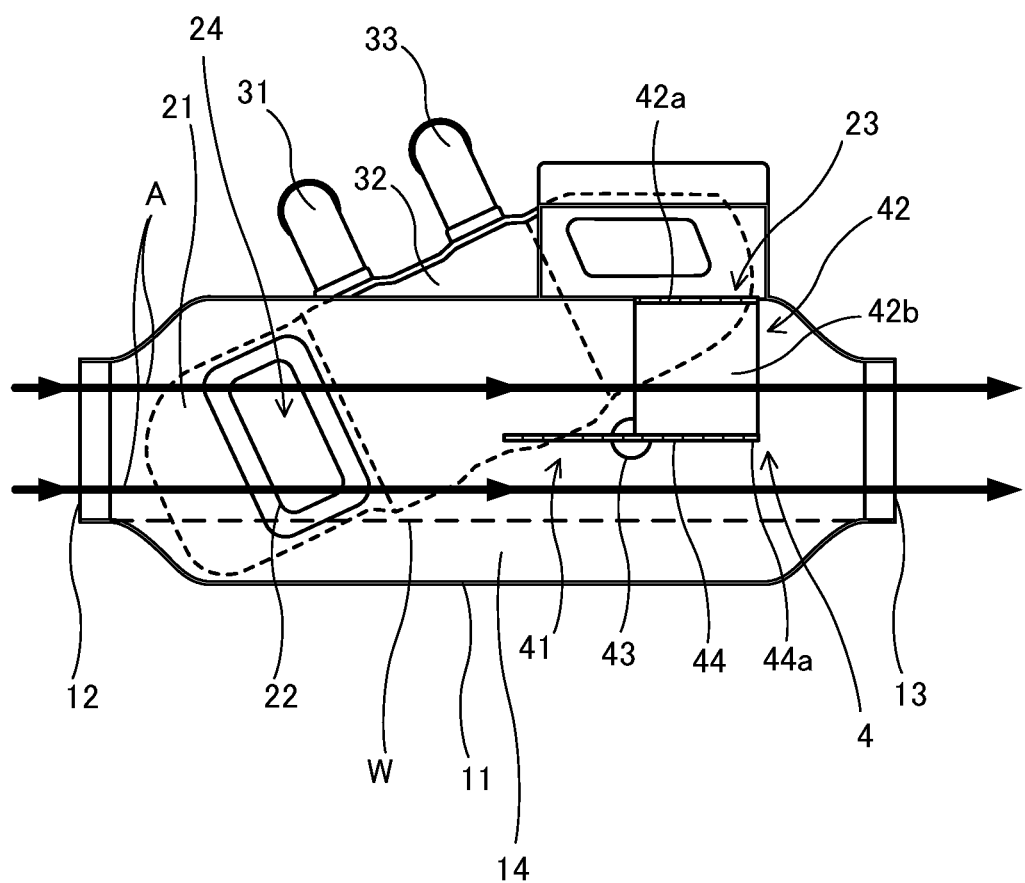
FIG. 9 is a schematic view when exhaust gas flows through a first flow path in FIG. 7.
Figure 10:
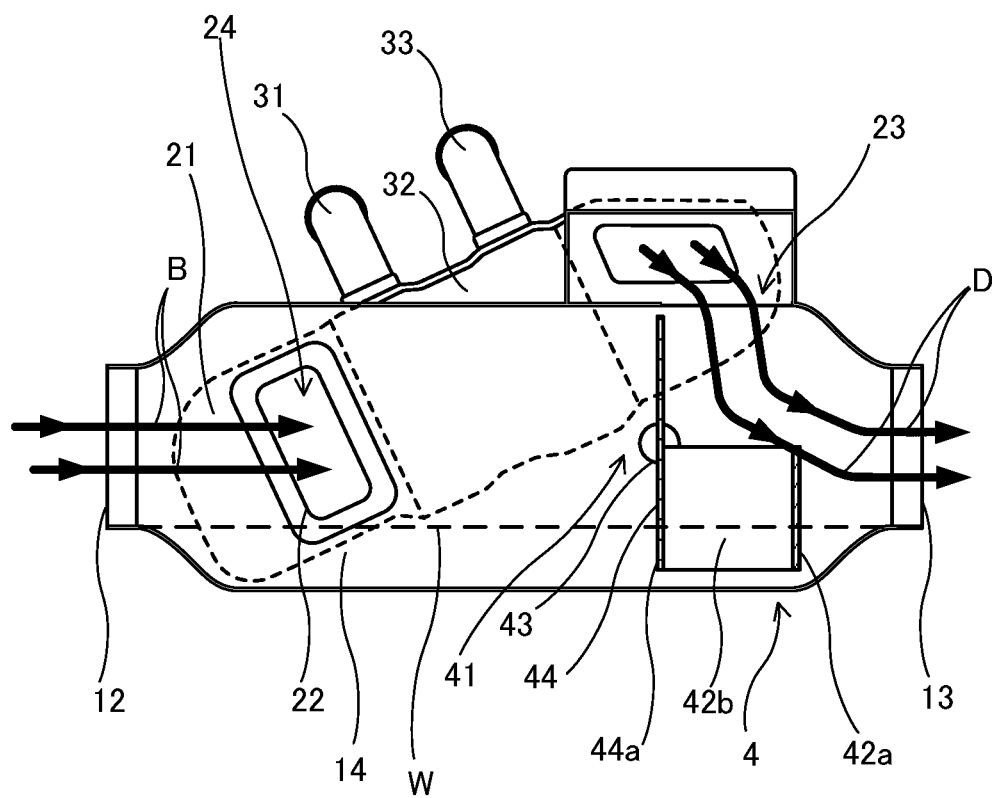
FIG. 10 is a schematic view when the exhaust gas flows through a second flow path in FIG. 7.
Figure 11:
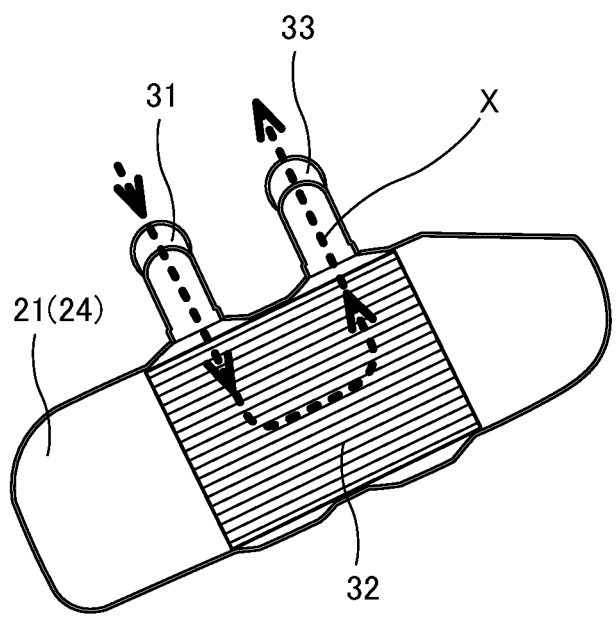
FIG. 11 is a schematic view of an XI-XI cross section in FIG. 2, and is a schematic view when the exhaust gas flows through the first flow path.
Figure 12:
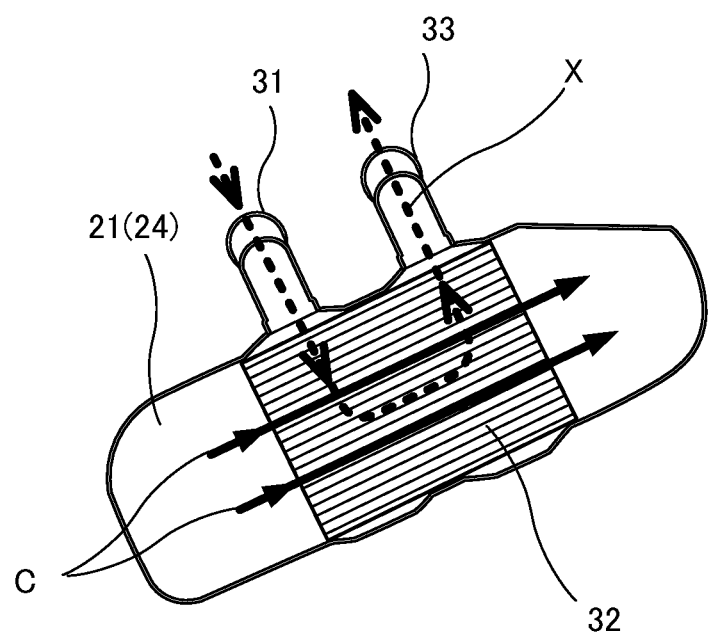
FIG. 12 is a schematic view when the exhaust gas flows through the second flow path in FIG. 11.

FIG. 9 is a schematic view when the exhaust gas flows through the first flow path 14 in FIG. 7. FIG. 10 is a schematic view when the exhaust gas flows through the second flow path 24 in FIG. 7. FIG. 11 is a schematic view of an XI-XI cross section in FIG. 2, and is a schematic view when the exhaust gas flows through the first flow path 14. FIG. 12 is a schematic view when the exhaust gas flows through the second flow path 24 in FIG. 11.

First, the non-heat recovery (for example, a case where warm-up of the engine is not necessary) as a case where the heat recovery from the exhaust gas is not necessary will be described with reference to FIGS. 9 and 11. In this case, the control unit rotationally drives the drive shaft 51 to rotate the rotation shaft portion 43, thereby switching the valve body 44 and the shutter portion 42 of the valve mechanism 4 to positions shown in FIG. 9. Therefore, the valve mechanism 4 is switched such that the valve body 44 of the butterfly valve 41 opens the first flow path 14 and the shutter portion 42 closes the second outflow port 23.

As shown in FIG. 9, when the first flow path 14 is opened and the second outflow port 23 is closed, the exhaust gas flowing from the exhaust flow path passes through the inside of the main body 11 from the first inflow port 12 as indicated by an arrow A, and flows out from the first outflow port 13 to the downstream side of the exhaust flow path (outside of the main body 11). In addition, when the second outflow port 23 is closed, the exhaust gas does not flow in the main body 21 (in the second flow path 24) as shown in FIG. 11. Therefore, the heat exchange between the exhaust gas and the cooling water flowing through the heat exchange unit 3 is not performed. That is, the exhaust gas is discharged to the outside without being heat-recovered.

Next, a case where the heat recovery from the exhaust gas is necessary (for example, a case where warm-up of the engine is necessary) will be described with reference to FIGS. 10 and 12. In this case, the control unit rotationally drives the drive shaft 51 to rotate the rotation shaft portion 43, thereby switching the valve body 44 and the shutter portion 42 of the valve mechanism 4 to positions shown in FIG. 10. Therefore, the valve mechanism 4 is switched such that the valve body 44 of the butterfly valve 41 closes the first flow path 14 and the shutter portion 42 opens the second outflow port 23.

As shown in FIG. 10, when the first flow path 14 is closed and the second outflow port 23 is opened, the exhaust gas flowing from the exhaust flow path passes through the second inflow port 22 from the first inflow port 12 as indicated by an arrow B, and flows into the main body 21 (second flow path 24) of the second flow path member 2. As shown in FIG. 12, the exhaust gas flowing into the main body 21 from the second inflow port 22 flows in a direction of an arrow C. Here, when the exhaust gas flows in the heat exchanger main body 32 in the main body 21, the heat exchange between the exhaust gas and the cooling water flowing through the heat exchange unit 3 (cooling water flowing in a direction of a broken line arrow X in FIG. 12) is performed. That is, the cooling water is warmed. The warmed cooling water flows out from the refrigerant outflow portion 33 and is supplied to the engine, so that the engine can be warmed up.

As indicated by arrows C and D in FIGS. 10 and 12, the exhaust gas whose heat is recovered passes through the second outflow port 23 and flows out from the first outflow port 13 to the downstream side of the exhaust flow path (outside of the main body 11).

According to the above embodiment, the following effects are exerted.

The exhaust heat recovery device 100 that recovers heat of exhaust gas discharged from an engine by heat exchange with a refrigerant includes: the first flow path member 1 in which the first flow path 14 through which the exhaust gas flows is formed; the second flow path member 2 which is provided adjacent to the first flow path member 1, in which the second flow path 24 that bypasses a part of the first flow path 14 is formed, and which includes the heat exchange unit 3 configured to perform heat exchange between the exhaust gas flowing in the second flow path 24 and the refrigerant; the valve mechanism 4 configured to switch between opening and closing of the first flow path 14 and the second flow path 24 by rotation of the rotation shaft portion 43 disposed in the first flow path member 1; and the drive unit 5 which includes the drive shaft 51 configured to rotate the rotation shaft portion 43. The second flow path member 2 is disposed so as to be inclined with respect to a flow direction of the exhaust gas in the first flow path 14, and the drive shaft 51 extends toward the first flow path member 1 and is connected to the rotation shaft portion 43 in the region S formed on a lateral side of the second flow path member 2 when viewed in an axial direction of the drive shaft 51 of the actuator 5 by disposing the second flow path member 2 so as to be inclined with respect to the first flow path member 1.

The second flow path member 2 is disposed so as to be inclined away from the first flow path 14 from an upstream side to a downstream side in the flow direction of the exhaust gas in the first flow path 14.

The drive shaft 51 is disposed in a region surrounded by the lower edge portion 2a of the second flow path member 2, the lower edge portion 1a of the first flow path member 1, and the downstream side end portion 1b in the flow direction of the exhaust gas in the first flow path member 1 when viewed in the axial direction of the drive shaft 51 of the actuator 5.

According to these configurations, the rotation shaft portion 43 (valve mechanism 4) and the drive shaft 51 (actuator 5) can be disposed on the upstream side in the flow direction of the exhaust gas in the first flow path 14. Accordingly, the entire exhaust heat recovery device 100 can be made compact in the flow direction (longitudinal direction) of the exhaust gas in the first flow path 14.

The drive shaft 51 is connected to the one end 43a of the rotation shaft portion 43, which protrudes to an outside of the first flow path member 1, in the region S.

The rotation shaft portion 43 has a cantilever structure in which only the one end 43a is supported.

According to these configurations, it is possible to reduce the influence of the heat of the exhaust gas on the valve mechanism 4 (rotation shaft portion 43). Therefore, the durability of the exhaust heat recovery device 100 can be improved.

The actuator 5 is disposed with the second flow path member 2 interposed between the actuator 5 and the first flow path member 1.

The actuator 5 is disposed along the first flow path 14 so as to be inclined with respect to the flow direction of the exhaust gas in the first flow path 14.

According to these configurations, it is possible to suppress the influence of the heat of the exhaust gas on the actuator 5. That is, the durability of the actuator 5 can be improved. Therefore, the durability of the exhaust heat recovery device 100 can be improved.

The exhaust heat recovery device 100 further includes the bracket 6 surrounding an outside of the drive shaft 51.

According to this configuration, the drive shaft 51 can be protected from flying objects such as flying stones.

The first flow path member 1 includes the first inflow port 12 through which the exhaust gas flows in and the first outflow port 13 through which the exhaust gas flowing in from the first inflow port 12 flows out, and the second flow path member 2 includes the second inflow port 22 connected to the first flow path member 1 on the first inflow port 12 side and the second outflow port 23 connected to the first flow path member 1 on the first outflow port 13 side. The valve mechanism 4 further includes: the butterfly valve 41 configured to open and close the first flow path 14; and the shutter portion 42 configured to close the second outflow port 23 when the butterfly valve 41 opens the first flow path 14 and open the second outflow port 23 when the butterfly valve 41 closes the first flow path 14.

According to this configuration, the first flow path 14 and the second outflow port 23 can be opened and closed by integrally moving the butterfly valve 41 and the shutter portion 42. That is, the number of components can be reduced as compared with a case where the butterfly valve 41 (valve body 44) and the shutter portion 42 are rotationally moved by separate mechanisms. In addition, since the second flow path 24 is not opened during the non-heat recovery and it is possible to prevent the exhaust gas from flowing into the second flow path 24, it is possible to improve the performance of the exhaust heat recovery device 100 during the non-heat recovery.

The heat exchange unit 3 is provided at a position higher than the water immersion line W positioned at the lower ends of the first inflow port 12 and the first outflow port 13.

The second inflow port 22 and the second outflow port 23 are provided at positions higher than the water immersion line W.

According to these configurations, it is possible to prevent the heat exchange unit 3 from being immersed. Therefore, obstruction of the flow of the exhaust gas in the second flow path 24 due to the immersion of the heat exchange unit 3 can be prevented. Accordingly, it is possible to prevent the decrease in the heat recovery efficiency between the exhaust gas and the cooling water in the heat exchange unit 3.

The main body 52 of the actuator (drive unit) 5 is fixed to an exterior (housing) of the heat exchanger main body 32 of the heat exchange unit 3.

According to this configuration, the main body 52 of the actuator 5 is less likely to be affected by the heat of the exhaust gas flowing through the first flow path member 1 and the heat of the exhaust gas flowing through the second flow path member 2, and thus the durability of the actuator 5 can be ensured, and cost can be reduced since no special heat countermeasure for the actuator 5 is required.

Although the embodiments of the present invention have been described above, the above-mentioned embodiments are merely a part of application examples of the present invention, and do not mean that the technical scope of the present invention is limited to the specific configurations of the above-mentioned embodiments.

The present application claims priority under Japanese Patent Application No. 2020-094806 filed to the Japan Patent Office on May 29, 2020, and an entire content of this application is incorporated herein by reference.

The invention claimed is:

1. An exhaust heat recovery device configured to recover heat of exhaust gas discharged from an engine by heat exchange with a refrigerant, the exhaust heat recovery device comprising:
   a first flow path member in which a first flow path through which the exhaust gas flows is formed;
   a second flow path member which is provided adjacent to the first flow path member, in which a second flow path that bypasses a part of the first flow path is formed, and which includes a heat exchange unit configured to perform heat exchange between the exhaust gas flowing in the second flow path and the refrigerant;
   a valve mechanism configured to switch between opening and closing of the first flow path and the second flow path by rotation of a rotation shaft portion disposed in the first flow path member; and
   a drive unit which includes a drive shaft configured to rotate the rotation shaft portion, wherein
   the second flow path member is disposed so as to be inclined with respect to a flow direction of the exhaust gas in the first flow path, and
   the drive shaft extends toward the first flow path member and is connected to the rotation shaft portion in a region formed on a lateral side of the second flow path member when viewed in an axial direction of the drive shaft of the drive unit by disposing the second flow path member so as to be inclined with respect to the first flow path member.

2. The exhaust heat recovery device according to claim 1, wherein the drive unit is disposed with the second flow path member interposed between the drive unit and the first flow path member.

3. The exhaust heat recovery device according to claim 1, wherein the drive shaft is connected to one end of the rotation shaft portion, which protrudes to an outside of the first flow path member, in the region.

4. The exhaust heat recovery device according to claim 1, wherein the second flow path member is disposed so as to be inclined away from the first flow path from an upstream side to a downstream side in the flow direction of the exhaust gas in the first flow path.

5. The exhaust heat recovery device according to claim 1, wherein
   the second flow path member is disposed so as to be inclined upward away from the first flow path from an upstream side to a downstream side in the flow direction of the exhaust gas in the first flow path, and
   the drive shaft is disposed in a region surrounded by a lower edge portion of the second flow path member, a lower edge portion of the first flow path member, and a downstream side end portion in the flow direction of the exhaust gas in the first flow path member when viewed in the axial direction of the drive shaft of the drive unit.

6. The exhaust heat recovery device according to claim 1, wherein the rotation shaft portion has a cantilever structure in which only one end is supported.

7. The exhaust heat recovery device according to claim 1, wherein the drive unit is disposed along the first flow path member so as to be inclined with respect to the flow direction of the exhaust gas in the first flow path.

8. The exhaust heat recovery device according to claim 1, further comprising:
   a bracket surrounding an outer side of the drive shaft.

9. The exhaust heat recovery device according to claim 1, wherein
   the first flow path member includes a first inflow port through which the exhaust gas flows in and a first outflow port through which the exhaust gas flowing in from the first inflow port flows out,
   the second flow path member includes a second inflow port connected to the first flow path member on a first inflow port side and a second outflow port connected to the first flow path member on a first outflow port side, and
   the valve mechanism includes:
      a butterfly valve configured to open and close the first flow path; and
      a shutter portion configured to close the second outflow port when the butterfly valve opens the first flow path and open the second outflow port when the butterfly valve closes the first flow path.

10. The exhaust heat recovery device according to claim 1, wherein
   the first flow path member includes a first inflow port through which the exhaust gas flows in, and a first outflow port through which the exhaust gas flowing in from the first inflow port flows out,
   the second flow path member includes a second inflow port connected to the first flow path member on a first inflow port side and a second outflow port connected to the first flow path member on a first outflow port side, and
   the heat exchange unit is provided at a position higher than a water immersion line at lower ends of the first inflow port and the first outflow port.

11. The exhaust heat recovery device according to claim 10, wherein the second inflow port and the second outflow port are provided at positions higher than the water immersion line.

12. The exhaust heat recovery device according to claim 1, wherein a main body of the drive unit is fixed to a heat exchanger main body of the heat exchange unit.

* * * * *